(12) United States Patent
Linnartz et al.

(10) Patent No.: US 6,738,904 B2
(45) Date of Patent: May 18, 2004

(54) RECORDABLE STORAGE MEDIUM WITH PROTECTED DATA AREA

(75) Inventors: Johan Paul Marie Gerard Linnartz, Eindhoven (NL); Antonius Adrianus Cornelis Maria Kalker, Eindhoven (NL); Johan Cornelis Talstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 198 days.

(21) Appl. No.: 09/828,005

(22) Filed: Apr. 6, 2001

(65) Prior Publication Data

US 2001/0049662 A1 Dec. 6, 2001

(30) Foreign Application Priority Data

Jun. 2, 2000 (EP) .............................. 00201951

(51) Int. Cl.[7] .............................................. G06F 12/14
(52) U.S. Cl. ........................................ 713/189; 380/232
(58) Field of Search ................................. 713/189, 193, 713/194, 168; 705/51, 57; 380/201, 231, 232; 369/44.26

(56) References Cited

U.S. PATENT DOCUMENTS

| | | | | |
|---|---|---|---|---|
| 6,144,745 A | * | 11/2000 | Akiyama et al. ............ | 380/232 |
| 6,425,098 B1 | * | 7/2002 | Sinquin et al. ............. | 714/699 |
| 6,438,235 B2 | * | 8/2002 | Sims, III .................... | 380/285 |
| 6,519,213 B1 | * | 2/2003 | Song et al. .............. | 369/44.26 |

FOREIGN PATENT DOCUMENTS

| | | | | |
|---|---|---|---|---|
| EP | 0908810 | | 4/1999 | ............. G06F/1/00 |
| EP | 0 984 346 | * | 3/2000 | ............. G06F/1/00 |

* cited by examiner

Primary Examiner—Matthew Smithers

(57) ABSTRACT

The invention relates to a method of storing data on a rewritable data storage medium, to a corresponding storage medium, to a corresponding recording apparatus and to a corresponding playback apparatus. Copy-protective measures require that on rewritable storage media some data must be stored which shall not be modifiable or erasable by consumer end products. A practical problem is the storage of large quantities of such data in a fixed data area. Typically the capacity is limited to a few bits. Meanwhile the amount of copy protection data that needs to be stored may well exceed the storage capacity available in the read-only fixed data area. The invention therefore proposes to write the copy protection data as system data in the recordable data area (4), e.g. as part of the formatting of the medium (1). A cryptographic summary is computed and also stored in the recordable data area (32) or in the fixed data area (2) such that a cryptographic relationship between the fixed data area (2) and the system data area (3) is provided. A playback or replay apparatus will only accept a storage medium with a valid combination of copy protection data and fixed data.

19 Claims, 3 Drawing Sheets

RECORDABLE STORAGE MEDIUM WITH PROTECTED DATA AREA

The invention relates to a method of storing data on a rewritale data storage medium, to a storage medium, to a recording apparatus for storing data on a rewritable data storage medium and to a playback apparatus for playback of user data stored on a rewritable data storage medium.

The invention addresses a storage medium on which users can store copyrighted and copy-free material. Often the user has a right to store and copy content, but there are restrictions to the number of (generations of) copies that he can make. Encryption is used to ensure that copy-righted content can only be interpreted by "compliant" devices which adhere to copy protective restrictions. A further protection is needed to avoid that non-compliant devices can make a bitwise copy of encrypted data. This is often avoided by storing essential information, e.g. a decryption key, in a manner that can not be copied.

More generally it is concluded that copy-protective measures require that on recordable discs some data must be stored which shall not be modifiable or erasable by consumer end products. These data will be called "system data" in the following. Examples of "system data" are:

- a unique disc identifier number which is used to encrypt the data that the user stores on the disc,
- a list consisting of a single key which has been encrypted with a number of different manufacturer-specific or device-specific keys,
- a list of electronic serial numbers of revoked devices or revoked discs. By storing such a list on all blank discs, revocation instructions can be disseminated to consumer devices. Upon receipt of such revocation instructions, compliant devices refuse to communicate with revoked devices.

Content or data recorded by the user will be called "user data" in the following. Moreover, the term "fixed data area" will be used for an area of the storage medium in which any information is stored that is read-only and not modifiable by consumer devices. On the contrary, in the "recordable data area" information is stored which can be modified by consumer devices. Also data, which can only be written by consumer devices after some modifications ("hacks") have been made to the device by malicious users will be stored in the recordable data area. Such modifications can be a change in the firmware or software used to control the recorder.

To store data in the fixed data area requires the use of components which are typically not available in consumer devices. An example of a technique to store such data is a "wobble", which is a radial deviation of the pit positions or the pregroove from a perfect spiral. Laws of physics and mechanics prohibit that such a wobble can be written on the fly by a laser as available in a consumer recorder for optical discs. Other examples of data stored in the fixed data area are the BCA code, proposed for DVD-ROM, selectively damaged spots on the disc material burned by high power lasers, or data stored in a special area of the disc which contains read-only material.

A practical problem is the storage of large quantities of data in the fixed data area. Typically the capacity is limited to a few (hundreds of) bits. Meanwhile the amount of system data that needs to be stored may well exceed the storage capacity available in the fixed data area.

The invention has therefore for its object to provide a method of storing data on a rewritable data storage medium according to which the above mentioned problems are overcome and which allows the storage of large quantities of system data in a tamper-resistant manner. Further, a corresponding storage medium, a corresponding recording apparatus and a corresponding playback apparatus shall be provided.

These objects are achieved according to the invention by a method as set forth in claim 1 or 2, by a storage medium as set forth in claim 9 or 10, by a recording apparatus as set forth in claim 12 or 13 and by a playback apparatus as set forth in claim 14 or 15.

The invention is mainly based on the idea that there exists some cryptographic relationship between data stored in the fixed data area and system data. This relationship is made up by the cryptographic summary which is according to the invention generated from the system data alone or from both the system data and identification data which can be a random number stored in the fixed data area. This cryptographic summary is used by a recording or playback apparatus to detect whether the system data have been tampered with, e.g. erased or modified in order to manipulate the copy proctection of the storage medium. The cryptographic summary is thus used for verification of the system data which means that in case of a verification failure playback or recording of the content of the storage medium can be stopped.

According to a first solution the system data are written in the recordable data area, e.g. as part of the formatting of the storage medium. A cryptographic summary, e.g. a cryptographic hash, is computed over the system data, and the result of that cryptographic summary, e.g. the result of that hash, is stored in the fixed data area. A recording apparatus will then only accept a storage medium with a valid combination of system data and fixed data, i.e. cryptographic summary.

According to an alternative solution identification data, e.g. a random number, are created and stored in the fixed data area. The recordable data area then contains the user data, the system data and a cryptographic summary of the system data and the identification data, e.g. an electronic signature thereof. A recording or playback apparatus will then use a verifier (e.g. a public key) to check the validity of the cryptographic summary, the system data and the identification data, i.e. the validity of the signature will be checked. Instead of using an electronic signature a message authentication code (MAC) can be used for the verification which is cheaper but less secure.

Other preferred embodiments of the invention are disclosed in the dependent claims.

BRIEF DESCRIPTION OF THE DRAWINGS

The invention and preferred embodiments thereof are explained hereinafter in more detail with reference to the following drawings in which.

DETAILED DESCRIPTION OF THE PREFERRED EMBODIMENT

Figure 1:
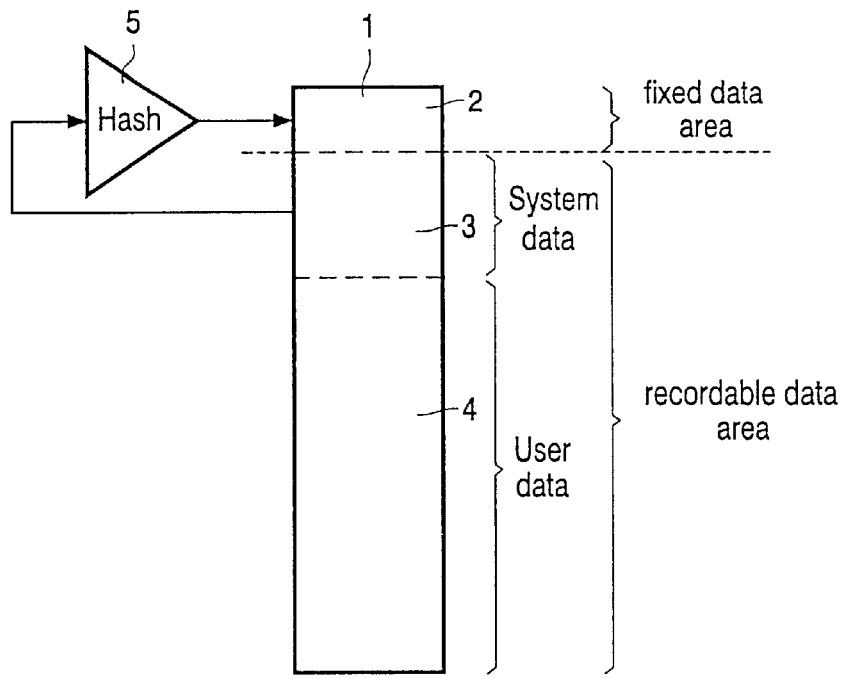
FIG. 1 shows a recording method according to a first embodiment.

FIG. 1 shows a diagram explaining the method of storing data on a rewritable data storage medium according to a first embodiment of the invention. The storage medium 1, which can be a disc for optical recording of data, e.g. at DVD or a CD, is separated into a read-only fixed data area 2 and a recordable data area 3, 4 which is subdivided into a system data area 3 and a user data area 4. Data stored in the fixed data area 2 can not be modified by consumers. A typical implementation of the fixed data area 2 is the pressing of pits into a rewritable disc, i.e. part of the rewritable disc is used as a CD-ROM or DVD-ROM medium. Another implementation is the BCA (Burst Cut Area), a barcode pattern at the very inner radius of the disc, written by a YAG laser in the disc-factory. A third implementation is to store the fixed data in the radial displacement of the prepressed pits ("pit-wobble") or the radial displacement of the pre-groove ("pre-groove wobble").

Data stored in the recordable data area 3, 4 can be modified by a consumer. Nevertheless, the system data area is reserved for system data like copy protection information as outlined at the beginning. The largest part 4 of the recordable data area can be used for a storing user data, e.g. audio or video data.

Since the capacity of the fixed data 2 area is limited, but a growing amount of system data shall be stored but shall not be modifiable, the invention proposes to store the system data in the recordable data area 3 and to install a cryptographic relationship between the system data and a specific information stored in the fixed data area 2 which can not be modified during subsequent recording or replay. Therefore a cryptographic summary of the system data is computed by the genera-ting means 5, which compute a hash of the system data in this embodiment. The cryptographically secure result of that hash is then stored in the fixed data area 2.

The method described in FIG. 1 is preferably implemented on a recording apparatus for storing the system data and the cryptographic summary on an empty medium using the same or separate recording means.

Figure 2:
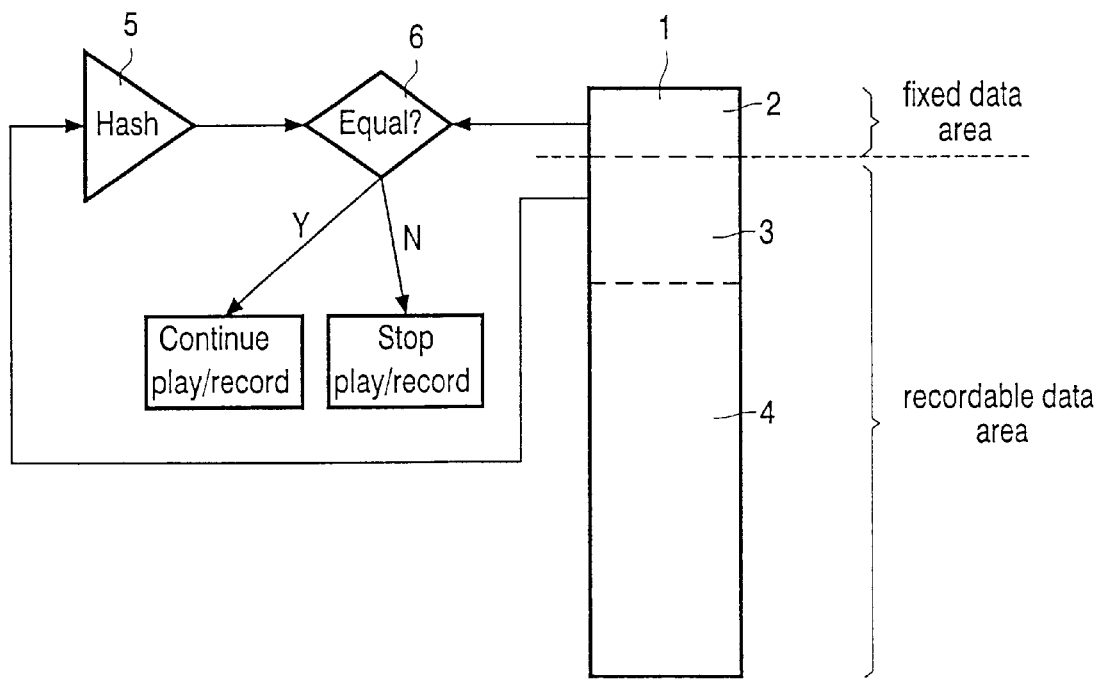
FIG. 2 shows a playback method according to a first embodiment.

In the playback apparatus as shown in FIG. 2 a hash of the system data stored in the system data area 3 is computed by similar generating means 5 contained in the playback apparatus. The result of that computation is forwarded to verifying means 6 in the playback apparatus which also receive the cryptographic summary read from the fixed data area 2 of the medium 1. If this cryptographic summary equals the result of the hash computation the verification is successfull and the playback of user data can start or continue whereas after a verification failure the playback can be stopped since the probabilty is high that the system data have been manipulated. Reading means for reading the system data and the cryptographic summary from the medium are not shown.

In a pratical realization the medium 1 can be imagined as an (at first empty) DVD-RAM or a CD-RW or some other rewritable medium which is sold and contains a list of serial-numbers of known pirated recorders, hereafter referred to as 'naughty' recorders already, written in the disc factory. The list is used by honest players of DVD-RAM/CD-RW or the other media to refuse to playback recordings of these naughty recorders, because they have been known to be involved in illegal copying. Such a list is usually too long (typically more than one MB) to store in a fixed data area (typically a few hundreds of bits). Therefore the list is written like a normal file on the rewritable medium in the factory. To prevent that anybody just erases or modifies this list, the hash of this list is computed. This hash is much shorter than the system data and can therefore easily be written into the fixed data area during the production of the medium. The honest player then would first, upon insertion of the medium, compute the hash of the system data and check the result with the hash stored in the fixed data area. If they don't match, the system data has been tampered with.

In this basic form no cryptographic secret (e.g. a cryptographic key) has to be used anywhere in the system. A disadvantage is, however, the lack of flexibility. This means that the actual bit-content of the fixed data area on the rewritable medium is fixed forever at the time of the production of the disc in the factory. Thus, the hash has to be computed of the system data that shall be protected prior to production of the disc. If the system data shall be changed, e.g. by adding more naughty recorders to the list, the hash necessarily also changes. New media then have to be produced by the factory, because the old ones no longer have the correct hash for the new system data. There are also other reasons why the system data shall be changed or updated at a time after the production of the disc and fixing of the hash.

Figure 3:
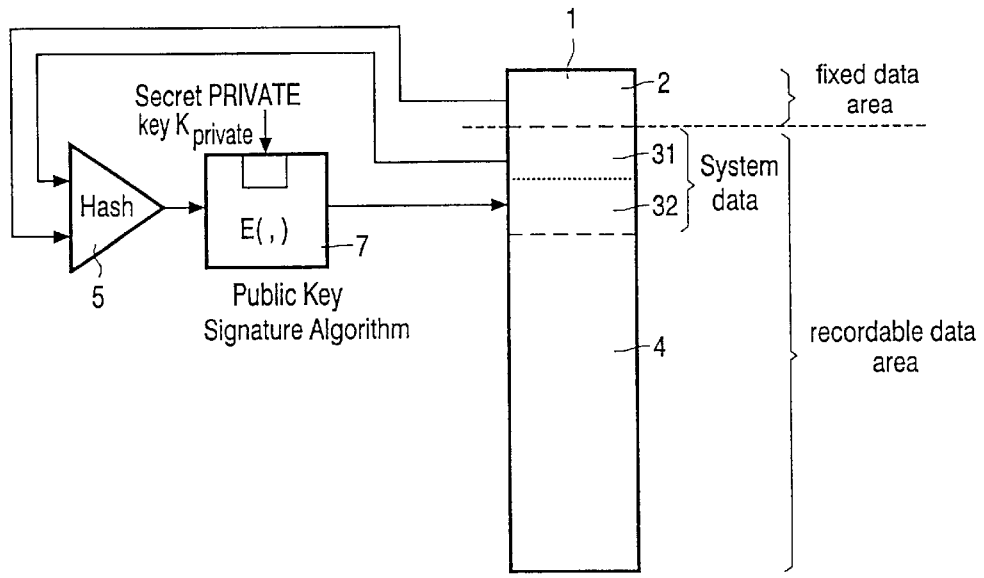
FIG. 3 shows a recording method according to a second embodiment.
Figure 4:
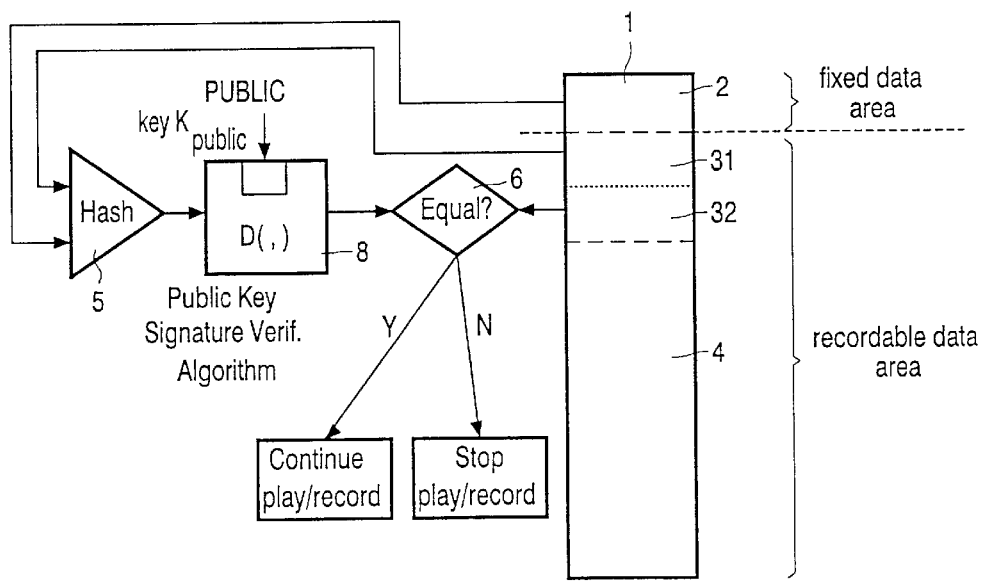
FIG. 4 shows a playback method according to the second embodiment.

More flexibility is achieved in a second embodiment of the invention as shown in FIGS. 3 and 4. According to this embodiment identification data, e.g. a random number, is stored in the fixed data area during production of the medium. The system data area is subdivided into a first area 31 for the actual system data and a second area 32 for storing a cryptographic summary. This cryptographic summary is generated by using a public key signature algorithm computed in the generating means 7. Therein a digital signature of the identification data and the system data which are at first hash-coded by the generating means 5 is computed using a secret private key $K_{private}$. This computation can also be written as ED=E (hash (system data, identification data), private key)

wherein ED means extra data (=cryptographic summary) and E means the public-key encryption. The computed digital signature is then stored as cryptographic summary in the second system data area 32.

In a replay apparatus or a recording apparatus as shown in FIG. 4 the system data are verified by at first computing the hash over the identification data and the system data and then using the public key signature verification algorithm in verifying means 8 and the public key $K_{public}$ to check the validity of the signature stored in the data area 32. The private key used for producing the digital signature in FIG. 3 must be kept secret, while the public key used for verification in the playback or the recording apparutus as shown in FIG. 4 can be distributed freely, because this public key is useless in the encryption step as described in FIG. 3.

Figure 5:
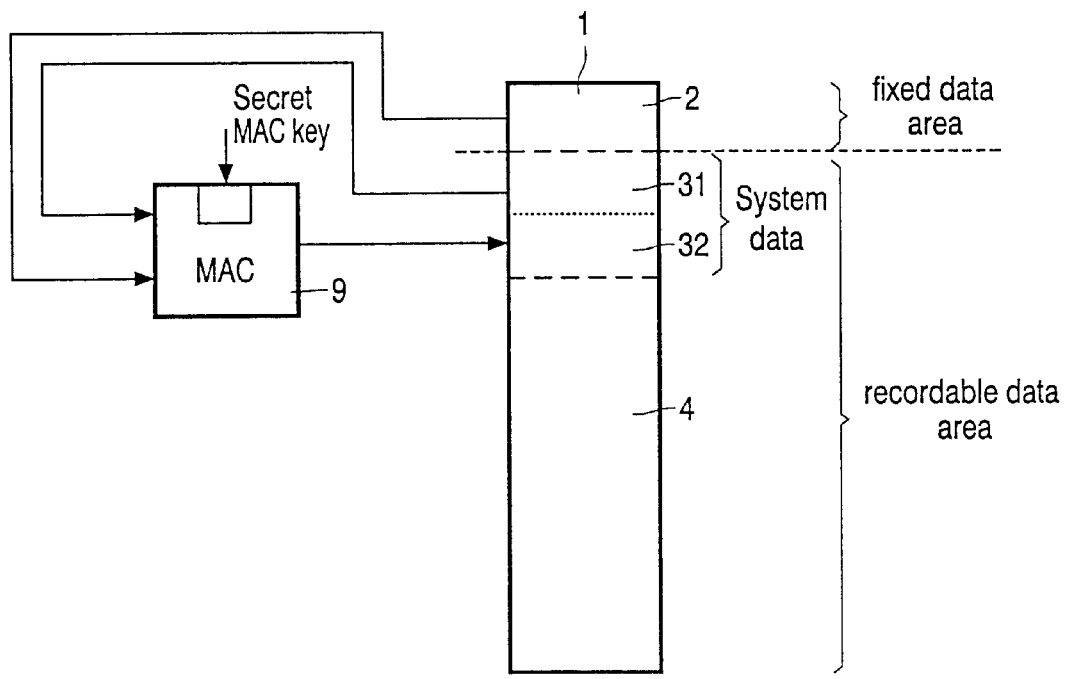
FIG. 5 shows a recording method according to a third embodiment and FIG. 6 shows a playback method according to the third embodiment.

A third embodiment is explained with reference to FIGS. 5 and 6. As in the second embodiment identification data are stored in a fixed data area 2 and the actual system data are stored in a system data area 31. For encryption the cryptographic summary which shall be stored in the system data area 32 is generated by the generating means 9 from the identification data and the system data using a message authentication code algorithm (MAC algorithm) and a secret MAC key. This MAC-encryption can be in short written as ED=E (system data, fixed data, MAC-key)

wherein ED means extra data (=cryptographic summary) and E means MAC-encryption.

Figure 6:
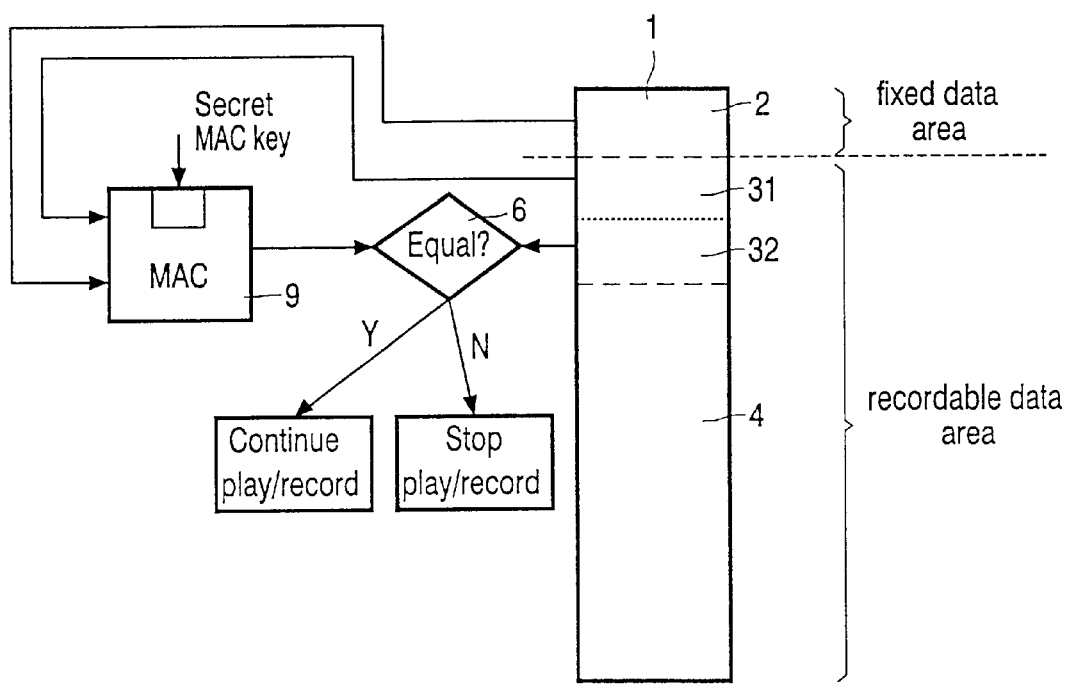

In the recording or playback apparatus as shown in FIG. 6 corresponding generating means 9 are provided for computing the message authentication code from the identification data and the system data using the same secret MAC-key. The computed MAC is compared in a verifying means 6 with the cryptographic summary (the MAC) stored in the system data area 32 for verification reasons.

Compared to the second embodiment shown in FIGS. 3 and 4 the use of the MAC is less secure than the use of the public-key signature. The key used to compute the MAC is present in every playback apparatus in the system, if someone breaks open any single player and gets hold of the key, this person can go ahead and replace the system data by other system data that still certify the MAC in the fixed data area. In contrast, in the public-key system of the second embodiment a secret private key is used in the encryption process whereas a published public key is used for verification.

By use of the invention it can be prevented that system data are manipulated. By storing special data in the fixed data area malevolent recorders can be prevented from copying old valid system data to new media, e.g. to replace a new large list of naughty recorders by an old short one. Since the system data itself are stored in the recordable data area the problem of limited capacity of the fixed data area is overcome.

Typically system data is stored or hidden in an area that is inaccessible to the user, or an area of the medium, where it doesn't interfere with the usual purpose of the disc, i.e. with user data storage. For DVD and CD media an example would be the so-called 'lead-in' and 'lead-out' areas of the disc. Hereafter such areas will collectively be referred to as 'corner area'. This has the advantage that it doesn't bother the user, and it also generally makes the production process much cheaper since corner areas can be stamped very fast, whereas recordable data have to be recorded at normal speed. In general players are much cheaper and simpler than recorders, so it is a relatively larger burden to players than to recorders to read out the system data in the corner area of the medium. So it makes sense to have the recorder, upon first use of the medium, read out the system data and copy its information to the main user data area in the recordable data area. The player can then just find the system data information in the main user data area which it can read anyway. A problem is that the player can not trust the recorder since the latter might not faithfully copy the system data. If, however, as according to the first embodiment of the invention a hash of the system data is stored in the fixed data area, the player can then verify that the incarnation of the system data in the main user data area agrees with the hash in the fixed data area. The recorder obviously can then not have manipulated the fixed data area.

It shall be noted that everytime any detail of the invention is described with reference to a playback apparatus the playback apparatus can be substituted by a recording apparatus. Both may comprise appropriate reading and/or recording means for reading and/or recording of data from or to the medium. Further, it shall be understood that the storage medium, the recording apparatus and the playback apparatus as set forth in the claims can be developed further in the same or a corresponding way as described above and as set forth in the subclaims with reference to the method of storing data.

What is claimed is:

1. Method of storing data on a rewritable data storage medium comprising a read-only fixed data area and a recordable data area wherein:
   system data are stored in the recordable data area,
   identification data are stored in the fixed data area,
   a cryptographic summary of the system data and the identification data is generated and stored in the recordable data area and
   the cryptographic summary is used for verification of the system data before reading and/or recording of user data,
   wherein the system data includes a key encrypted by one or more different manufacturer-specific or device-specific keys or one or more lists of revoked devices or revoked storage mediums.

2. Method as set forth in claim 1, characterized in that a hash function is used for generating the cryptographic summary and for verifying the system data.

3. Method as set forth in claim 1, characterized in that a message authentication code algorithm is used for generating the cryptographic summary and for verifying the system data.

4. Method as set forth in claim 1, characterized in that a key signature algorithm is used for generating the cryptographic summary and for verifying the system data and that a signature is stored as cryptographic summary.

5. Method as set forth in claim 1, characterized in that the cryptographic summary is generated and the system data are stored in the recordable data area as part of the formatting of the storage medium.

6. Method as set forth in claim 1, characterized in that the system data is originally stored in a corner area of the recordable data area and that during first use of the storage medium in a recording apparatus the system data are copied to a user data area of the recordable data area.

7. Storage medium for storing data comprising
   a read-only fixed data area in which identification data are stored,
   a recordable data area in which system data and a cryptographic summary of the system data and the identification data are stored, the cryptographic summary being provided for verification of the system data before reading and/or recording of user data,
   wherein the system data includes a key encrypted by one or more different manufacturer-Specific or device-specific keys or one or more lists of revoked devices or revoked storage mediums.

8. Storage medium as set forth in claim 7, characterized in that the storage medium is a rewritable optical storage medium, in particular a CD or a DVD.

9. Recording apparatus for storing data a rewritable data storage medium comprising
   generating means for generating identification data and a cryptographic summary of system data and the identification data and
   recording means for storing the cryptographic summary and the system data in a recordable data area of the medium and for storing the identification data in a read-only fixed data area of the medium, the cryptographic summary being provided for verification of the system data before reading and/or recording of user data,
   wherein the system data includes a key encrypted by one or more different manufacturer-Specific or device-specific keys or one or more lists of revoked devices or revoked storage mediums.

10. Playback apparatus for playback of user data stored on a rewritable data storage medium comprising
    reading means for reading identification data from a read-only fixed data area of the medium and for reading system data and a cryptographic summary of the system data and the identification data from a recordable data area of the medium and
    verifying means for generating a cryptographic summary of the system data and the identification data read from the medium and for verification of the system data by use of the generated cryptographic summary, wherein the system data includes a key encrypted by one or more different manufacturer-specific or device-specific keys or one or more lists of revoked devices or revoked storage mediums.

11. A storage medium with a fixed data area for storing data, the medium comprising:

a first fixed data area in the fixed data area; and a second fixed data area in the form of a corner area in the fixed data area, in which second fixed data area system data is stored; and wherein a cryptographic summary of the system data is stored in the first fixed data area, the cryptographic summary being capable of verification of the system data before reading and/or recording of user data.

12. The storage medium of in claim 11, wherein the storage medium further comprises a lead-in, the corner area being situated in the lead-in.

13. The storage medium of claim 11, wherein the cryptographic summary of the system data comprises the result of a hash of the system data.

14. The storage medium of claim 11, wherein the first fixed data area is a Burst Cut Area and the corner area includes a pit-wobble and/or a pre-groove wobble.

15. A method of producing a storage medium, comprising:

providing a rewritable data storage medium with a fixed data area, the fixed data area including a first fixed data area and a second fixed data area in the form of a corner area;

storing system data in the corner area of the second fixed data area;

generating a cryptographic summary of the system data, the cryptographic summary being capable of verification of the system data before reading and/or recording of user data;

storing the cryptographic summary in the first fixed data area.

16. Recording apparatus for storing data on a rewritable data storage medium, the apparatus comprising:

generating means for generating a cryptographic summary of system data; and recording means for storing the cryptographic summary of the system data in a first fixed data area; and for storing the system data in a corner area of a second fixed data area, the first and second fixed area being in a fixed area of the storage medium, the cryptographic summary being capable of verification of the system data before reading and/or recording of user data.

17. Playback apparatus for playback of user data stored on a rewritable data storage medium, the apparatus comprising:

reading means for reading a cryptographic summary of system data stored in the first fixed data area and for reading the system data stored in a corner area of a second fixed data area, the first and second fixed data areas being in a fixed area of the medium; and verifying means for generating a cryptographic summary of the system data read from the medium and for verification of the system data by use of the generated cryptographic summary.

18. The playback apparatus of claim 17, wherein the verifying means verifies the system data by comparing the cryptographic summary read from the first fixed data area to the cryptographic summary generated from the system data read from the corner area of the second fixed data area.

19. The storage medium of in claim 11, wherein:

the storage medium further comprises a lead-in, the corner area being situated in the lead-in;

the cryptographic summary of the system data comprises the result of a hash of the system data; and the first fixed data area is a Burst Cut Area and the corner area includes a pit-wobble and/or a pre-groove wobble.

* * * * *